(12) United States Patent
Kanno et al.

(10) Patent No.: US 7,638,227 B2
(45) Date of Patent: Dec. 29, 2009

(54) FUEL CELL HAVING STACK STRUCTURE

(75) Inventors: Yoshihito Kanno, Numazu (JP); Hideaki Kume, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 515 days.

(21) Appl. No.: 10/961,207

(22) Filed: Oct. 12, 2004

(65) Prior Publication Data

US 2005/0106448 A1    May 19, 2005

(30) Foreign Application Priority Data

Nov. 6, 2003    (JP)    ............................... 2003-376409

(51) Int. Cl.
*H01M 4/00* (2006.01)
*H01M 8/10* (2006.01)

(52) U.S. Cl. .......................................... 429/40; 429/32

(58) Field of Classification Search .................... 429/40, 429/32
See application file for complete search history.

(56) References Cited

U.S. PATENT DOCUMENTS

| | | | |
|---|---|---|---|
| 4,567,117 A * | 1/1986 | Patel et al. ..................... 429/19 |
| 4,851,377 A | 7/1989 | Breault | |
| 5,068,161 A * | 11/1991 | Keck et al. ..................... 429/44 |
| 5,478,662 A | 12/1995 | Strasser | |
| 5,500,292 A * | 3/1996 | Muranaka et al. ............ 429/209 |
| 5,672,439 A * | 9/1997 | Wilkinson et al. ............. 429/40 |
| 5,702,839 A * | 12/1997 | Frost et al. ..................... 429/42 |
| 6,048,633 A | 4/2000 | Fujii et al. | |
| 6,749,892 B2 * | 6/2004 | Chang ......................... 427/115 |
| 7,063,905 B2 * | 6/2006 | Menon et al. .................. 429/17 |
| 2002/0192533 A1 | 12/2002 | Gebhardt et al. | |
| 2004/0115486 A1 | 6/2004 | Takeshita et al. | |

FOREIGN PATENT DOCUMENTS

| | | |
|---|---|---|
| JP | A-1-151163 | 6/1989 |
| JP | A-04-357673 | 12/1992 |
| JP | A-05-144443 | 6/1993 |
| JP | A-6-267564 | 9/1994 |
| JP | A-09-092322 | 4/1997 |
| JP | A-11-7971 | 1/1999 |
| JP | A-2001-357869 | 12/2001 |

\* cited by examiner

*Primary Examiner*—Patrick Ryan
*Assistant Examiner*—Julian Mercado
(74) *Attorney, Agent, or Firm*—Oliff & Berridge, PLC

(57) ABSTRACT

A fuel cell having a stack structure is provided. The fuel cell includes plural unit cells each of which includes an anode and a cathode which are provided on both sides of a predetermined electrolyte membrane, and a catalytic layer which is provided in at least one of the anode and the cathode, and which supports a catalyst for promoting an anode reaction or a cathode reaction, the plural unit cells being stacked to form a stack structure. In the fuel cell, the plural unit cells include a unit cell including a catalyst layer supporting a catalyst which is different from catalysts supported by catalyst layers of other unit cells in at least one of type, weight, and specific surface area.

5 Claims, 6 Drawing Sheets

FUEL CELL HAVING STACK STRUCTURE

INCORPORATION BY REFERENCE

The disclosure of Japanese Patent Application No. 2003-376409 filed on Nov. 6, 2003, including the specification, drawings and abstract is incorporated herein by reference in its entirety.

BACKGROUND OF THE INVENTION

1. Field of the Invention

The invention relates to a fuel cell having a stack structure.

2. Description of the Related Art

A fuel cell is proposed, which includes a hydrogen electrode and an oxygen electrode provided on both sides of an electrolyte membrane which a hydrogen ion permeates, and a reaction represented by an equation described below is caused at each of the hydrogen electrode and the oxygen electrode, whereby electromotive force is generated.

Hydrogen electrode (anode): $H_2 \rightarrow 2H^+ + 2e^-$ (anode reaction)

Oxygen electrode (cathode): $(1/2) O_2 + 2H^+ + 2e^- \rightarrow H_2O$ (cathode reaction)

Various types of fuel cells are proposed according to the type of electrolyte membrane. For example, a solid oxide fuel cell, a molten carbonate fuel cell, a phosphoric acid fuel cell, and a polymer electrolyte fuel cell are proposed. Recently, attention has been given to the polymer electrolyte fuel cell, for the reasons that electric power density is high so that the size can be made small, and the operating temperature is relatively low, and other reasons. Various improvements of the polymer electrolyte fuel cell are examined.

There is a fuel cell having a stack structure, which is formed by stacking plural unit cells through separators. Each of the unit cells has a gas diffusible anode and a gas diffusible cathode which are provided on both sides of an electrolyte membrane. In the fuel cell having the stack structure (hereinafter, referred to as "fuel cell stack"), the temperature of unit cells positioned at both end portions in a direction in which the unit cells are stacked (hereinafter, referred to as "cell-stacked direction") tends to be lower than that of unit cells positioned at a center portion due to heat radiation. Therefore, in the unit cells at both end portions of the fuel cell stack, vapor pressure is reduced, and water generated by the aforementioned reaction is likely to be accumulated.

In the polymer electrolyte fuel cell, it is important to control water in each of the unit cells in order to ensure conductivity of the hydrogen ion in the electrolyte membrane, and to ensure gas diffusibility at a gas diffusion electrode formed by stacking a catalyst layer and a gas diffusion layer. For example, if the amount of water contained in the electrolyte membrane decreases, the conductivity of the hydrogen ion decreases, and accordingly electric power generation performance of the fuel cell decreases. Also, if generated water is accumulated at the gas diffusion electrode, so-called flooding occurs, and the gas diffusibility decreases. As a result, the electric power generation performance of the fuel cell decreases. Thus, various technologies concerning control of water in the unit cells of the polymer electrolyte fuel cell are proposed.

For example, Japanese Patent Laid-Open Publication No. 9-92322 discloses a related technology in which a flow amount of oxidizing agent gas is increased at both end portions of a fuel cell stack, and the flow amount of oxidizing agent gas is decreased at a center portion of the fuel cell stack, whereby amounts of water contained in plural electrolyte membranes are made uniform.

Also, Japanese Patent Laid-Open Publication No. 2001-357869 discloses a technology in which water repellency of cathode gas diffusion layers of unit cells positioned at both end portions of a fuel cell stack is made low as compared with unit cells positioned at other portions, or gas permeability of the cathode gas diffusion layers of the unit cells positioned at both end portions is made high as compared with the unit cells positioned at other portions, whereby accumulation of excessive water in cathode catalyst layers is suppressed.

In all of these technologies, a decrease in the electric power generation performance of the fuel cell is suppressed by controlling the wet state of the unit cells.

However, in the technology disclosed in the aforementioned Japanese Patent Laid-Open Publication No. 9-92322, there is a problem that the control of the flow amount of oxidizing agent gas becomes complicated. Also, in the technology disclosed in the aforementioned Japanese Patent Laid-Open Publication No. 2001-357869, a process of producing the gas diffusion layer becomes complicated considering the water repellency and gas permeability.

SUMMARY OF THE INVENTION

A first aspect of the invention relates to a fuel cell including plural unit cells each of which includes an anode and a cathode which are provided on both sides of a predetermined electrolyte membrane, and a catalytic layer which is provided in at least one of the anode and the cathode, and which supports a catalyst for promoting an anode reaction or a cathode reaction, the plural unit cells being stacked to form a stack structure. In the fuel cell, the plural unit cells include a unit cell including a catalyst layer supporting a catalyst which is different from catalysts supported by catalyst layers of other unit cells in at least one of type, weight, and specific surface area.

The description "a catalyst which is different in type" signifies that type of a single element constituting the catalyst is different, that type of alloy used as the catalyst is different, that the composition ratio of elements contained in alloy used as the catalyst is different, or that a carrier supporting the catalyst is different. Also, the description "a catalyst layer supporting a catalyst which is different from catalysts supported by catalyst layers of other unit cells in weight" signifies, for example, that thickness of the catalyst layer is different from the thickness of the catalyst layers of other unit cells in the case where catalysts having the same particle size are supported at the same density in the catalyst layer and the other catalyst layers. The specific surface area signifies surface area per unit weight.

In general, in the fuel cell stack, a predetermined temperature distribution occurs during operation, due to heat radiation to the atmosphere and the coolant as a result of the structure, thereof. Also, a non-uniform distribution of the wet state of the electrolyte membrane occurs according to the temperature distribution. Accordingly, a non-uniform distribution of the electric power generation performance of the unit cell also occurs in the fuel cell stack according to the temperature distribution and the distribution of the amount of water contained in the electrolyte membrane.

Also, in the case where a catalyst supported by a catalyst layer of a unit cell is different from catalysts supported by catalyst layers of other unit cells in type, weight, or specific surface area, reaction rates of the anode reaction and the cathode reaction in the unit cell are different from those in other unit cells. Therefore, performance of the catalyst which is decided by the type, weight, or the specific surface area of the catalyst is referred to as "catalytic ability".

In the configuration according to the invention, the fuel cell can be formed by stacking the plural unit cells that include the unit cell including the catalyst layer supporting the catalyst which is different from the catalysts supported by the catalyst layers of other unit cells in at least one of type, weight, and specific surface area, in order to compensate for a decrease in the electric power generation performance due to the temperature distribution and the distribution of the amount of water contained in the electrolyte membrane in the fuel cell stack. That is, the unit cell including the catalyst layer having the catalyst ability higher than that of the catalyst layers of other unit cells can be positioned at a portion where the temperature is likely to decrease, a portion where flooding is likely to occur, or a portion which is likely to be dried.

With the configuration, in the fuel cell having a stack structure, it is possible to obtain a sufficient area in which each of the aforementioned reaction occurs at the portion where the electric power generation performance is likely to decrease. Accordingly, it is possible to suppress a decrease in the electric power generation performance of the fuel cell even in the case where the temperature or the wet state of the unit cell is not optimal.

The catalytic ability does not necessarily need to compensate for a decrease in the electric power generation performance completely. However, the electric power generation performance of each unit cell can be made uniform by changing the catalyst ability such that a decrease in the electric power generation performance can be sufficiently compensated for.

A second aspect of the invention relates to a fuel cell including plural unit cells each of which includes an anode and a cathode which are provided on both sides of a predetermined electrolyte membrane, and a catalytic layer which is provided in at least one of the anode and the cathode, and which supports a catalyst for promoting an anode reaction or a cathode reaction. The plural unit cells include at least one unit cell including a catalyst layer in which an in-plane distribution of at least one of type, weight per unit area, and specific surface area of the catalyst is non-uniform.

The aforementioned non-uniform temperature distribution and the distribution of the amount of water contained in the electrolyte membrane occur also in the plane of at least one unit cell. Accordingly, a non-uniform in-plane distribution of the electric power generation performance also occurs according to the temperature distribution and the distribution of the amount of water contained in the electrolyte membrane in the plane of at least one unit cell.

According to the invention, the type, weight, or specific surface area of the catalyst is made non-uniform in the catalyst layer of at least one unit cell, in order to compensate for the in-plane distribution of the electric power generation performance due to the temperature distribution and the distribution of the amount of water contained in the electrolyte membrane in each unit cell. That is, the catalytic ability of the catalyst layer is made high at a region where the temperature is likely to decrease, the region where flooding is likely to occur, the region which is likely to be dried, as compared to the catalytic ability of the catalyst layers at other regions. For example, in general, the temperature is likely to decrease at the peripheral portion of the unit cell, as compared to the center portion of the unit cell. Therefore, the catalytic ability is made high at the peripheral portion of the unit cell, as compared to the center portion of the unit cell.

With the configuration, in the fuel cell having a stack structure, it is possible to obtain a sufficient area in which each of the aforementioned reactions occurs at the region of each cell in which the electric power generation performance is likely to decrease. Accordingly, it is possible to suppress a decrease in the electric power generation performance of the fuel cell even in the case where the temperature or the wet state of the unit cell is not optimal.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description, the present invention will be described in more detail in terms of exemplary embodiments.

A configuration of a fuel cell stack will be described.

Figure 1:
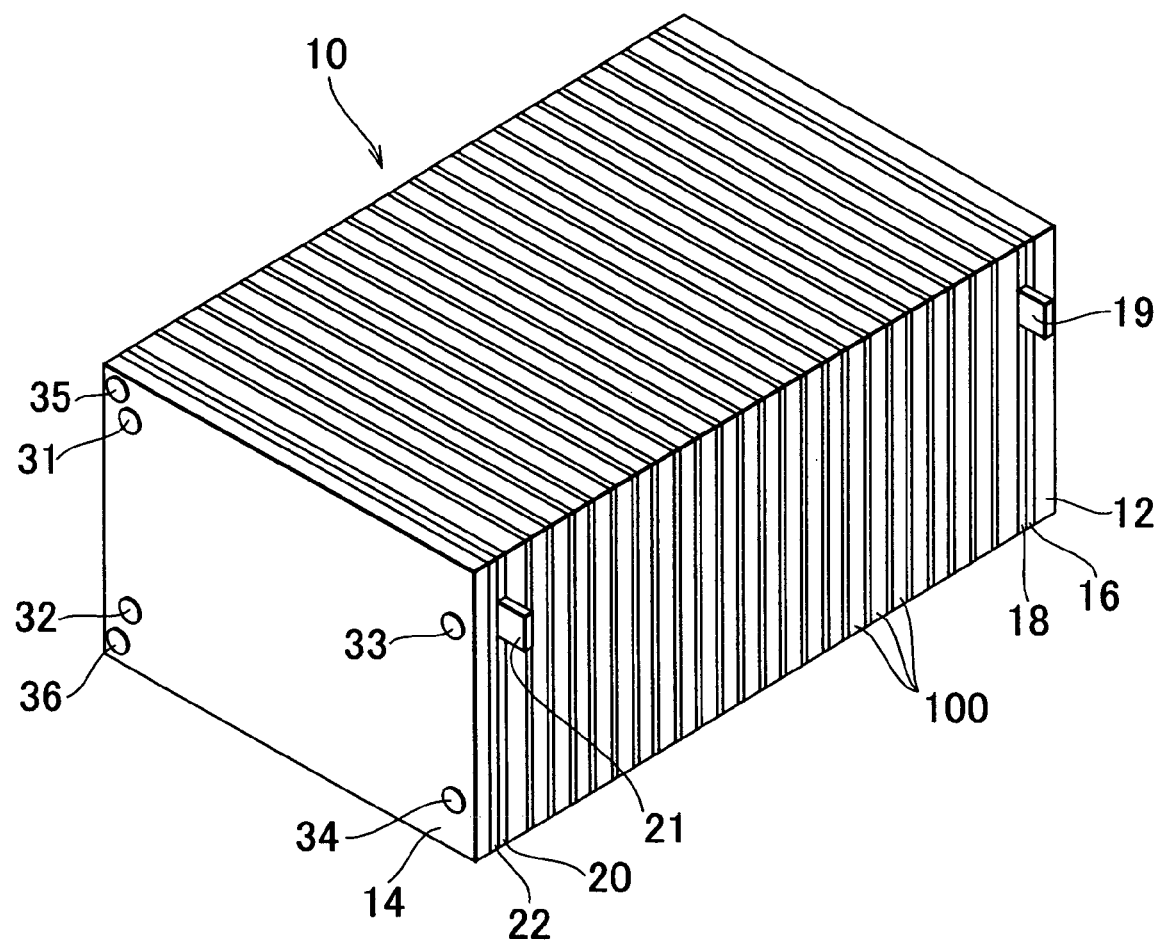
FIG. 1 is a perspective view showing an external appearance of a fuel cell stack 10.

FIG. 1 is a perspective view showing an external appearance of a fuel cell stack 10 according to the embodiment of the invention. As shown in FIG. 1, the fuel cell stack 10 is formed by stacking a predetermined number of unit cells 100. The number of the stacked unit cells can be set to any number according to output required of the fuel cell 10. One unit cell 100 produces electromotive voltage of approximately 1 V. Each unit cell 100 is formed as a polymer electrolyte fuel cell. The unit cell 100 has a structure in which an oxygen electrode, an electrolyte membrane, and a hydrogen electrode are sandwiched in this order between separators. In the fuel cell stack 10, one separator is shared by adjacent unit cells 100. The structure of the unit cell 100 will be described in detail later.

The fuel cell stack 10 is formed by stacking an end plate 12, an insulating plate 16, a current collector plate 18, plural unit cells 100, a current collector plate 20, an insulating plate 22, and an end plate 14 in this order from one end. The end plates 12 and 14 are formed using metal such as steel in order to ensure rigidity. The current collector plates 18 and 20 are formed using a gas-impermeable and conductive member such as densified carbon or a copper plate. The insulating plates 16 and 22 are formed using an insulative member such as rubber or resin. The current collector plate 18 is provided with an output terminal 19, and the current collector plate 20 is provided with an output terminal 21, whereby electric power generated by the fuel cell stack 10 can be output.

The end plate 14 on one side is provided with a fuel gas supply port 35, a fuel gas discharge port 36, an oxidizing gas supply port 33, an oxidizing gas discharge port 34, a coolant supply port 31, and coolant discharge port 32. The fuel gas supplied to the fuel cell stack 10 from the fuel gas supply port 35 is distributed to each unit cell 100 while flowing toward the end plate 12. The fuel gas distributed to each unit cell 100 flows in a passage in the unit cell 100 from an upper side to a lower side in the figure, and then flows to the end plate 14 side so as to be discharged from the fuel gas discharge port 36. Similarly, the oxidizing gas is supplied from the oxidizing gas supply port 33, and then is distributed to each unit cell 100 while flowing toward the end plate 12. The oxidizing gas distributed to each unit cell 100 flows in a passage in each unit cell 100, and then is discharged from the oxidizing gas discharge port 34. In the fuel cell stack 10, the gas passages of each unit cell 10 is formed such that the fuel gas and the oxidizing gas flow in the aforementioned manner.

Sealing is provided in an electrolyte membrane constituting each unit cell 100 of the fuel cell stack 10 at a peripheral portion that contacts a separator. This sealing prevents the fuel gas and the oxidizing gas from leaking from the inside of the unit cell 100 and being mixed with each other. The fuel cell stack 10 is fastened by a bolt and a nut (not shown) with predetermined pressing force being applied thereto in the cell-stacked direction, and is maintained in this state. The bolt and the nut do not necessarily need to be used in order to maintain the fuel cell stack 10 in the aforementioned stacked state with the pressing force being applied thereto. For example, a stack storing case may be used.

Figure 2:
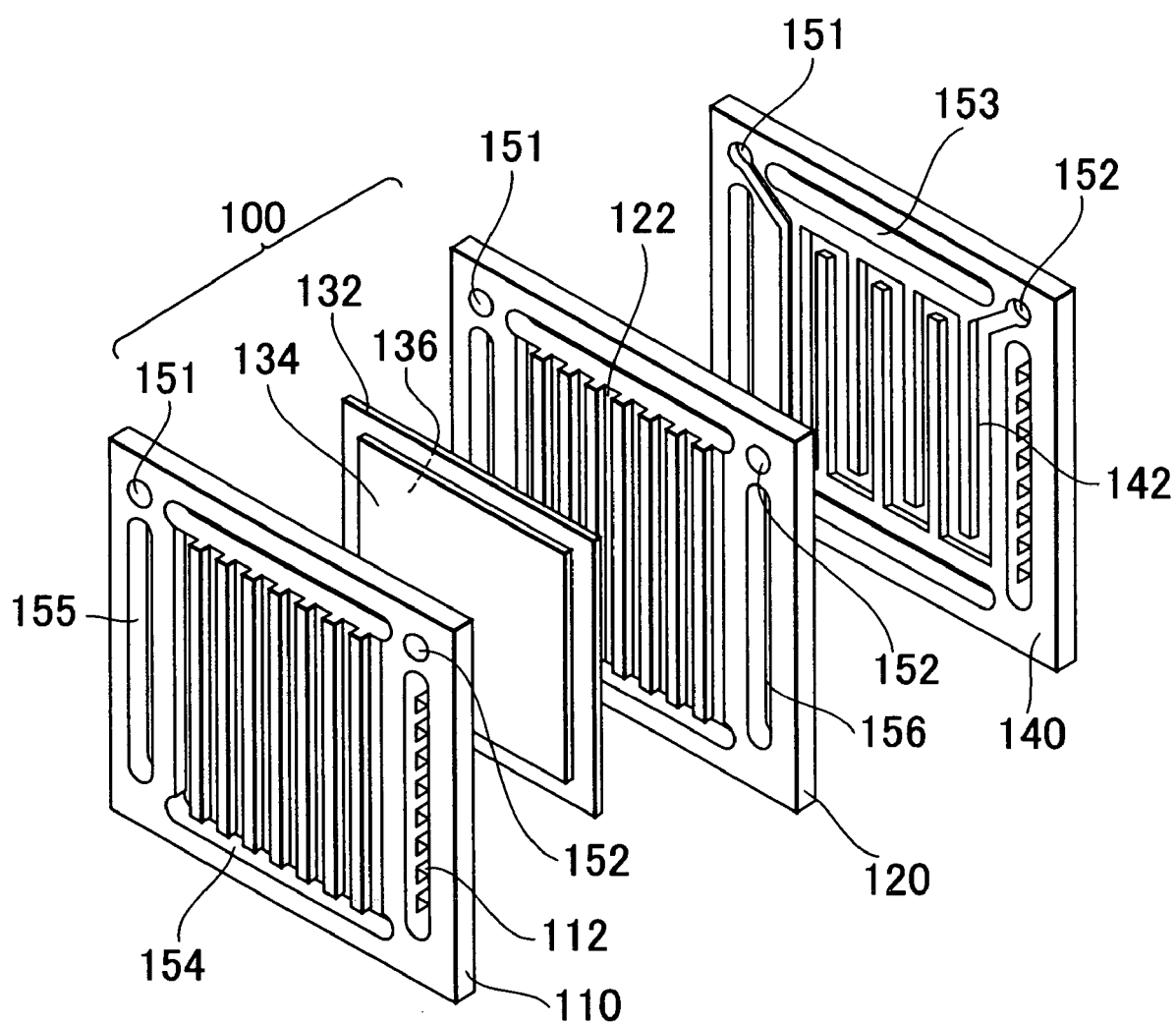
FIG. 2 is a perspective view showing a structure of a unit cell 100.

FIG. 2 is a perspective view showing the structure of the unit cell 100. The unit cell 100 is configured as a polymer electrolyte fuel cell. The unit cell 100 has a structure in which an electrolyte membrane 132 is sandwiched between a hydrogen electrode 134 and an oxygen electrode 136, and the hydrogen electrode 134 and the oxygen electrode 136 are sandwiched between separators 110 and 120 from both sides. In FIG. 2, the oxygen electrode 136 is not shown since the oxygen electrode 136 is provided at a position hidden by the electrode electrolyte membrane 132. Each of the hydrogen electrode 134 and the oxygen electrode 136 is a gas diffusion electrode formed by stacking a catalyst layer and a gas diffusion layer, as described later. Plural concave-convex ribs are formed on surfaces of the separators 110 and 120 which are opposed to the hydrogen electrode 134 and the oxygen electrode 136. Since the hydrogen electrode 134 and the oxygen electrode 136 are sandwiched between the separators 110 and 120 from both sides, a fuel gas passage 112 is formed between the separator 110 and the hydrogen electrode 134, and an oxidizing gas passage 122 is formed between the separator 120 and the oxygen electrode 136.

The ribs are formed on both surfaces of each of the separators 110 and 120. The fuel gas passage 112 is formed between one surface of each of the separators 110 and the hydrogen electrode 134. The oxidizing gas passage 122 is formed between the other surface of each of the separators 120 and the oxygen electrode 136. Thus, the gas passage is formed between each of the separators 110 and 120 and the gas diffusion electrodes 134 and 136. In addition, the separators 110 and 120 separate the flow of the fuel gas and the flow of the oxidizing gas between adjacent unit cells.

The electrolyte membrane 132 is an ion-exchange membrane having proton-conductivity, which is formed using solid polymer material such as fluorocarbon resin. The electrolyte membrane 132 exhibits good electric conductivity in a wet state. As the electrolyte membrane 132, for example, Nafion membrane (produced by DuPont) may be employed.

The catalyst layer is formed on the surface of the electrolyte membrane 132 by applying platinum, which is a catalyst, to the surface of the electrolyte membrane 132. In the embodiment, the catalyst is applied using a method in which i) carbon powders supporting platinum which is the catalyst is dispersed in organic solvent, ii) an appropriate amount of electrolyte solution (for example, Nafion Solution produced by Aldrich Chemical) is added to the organic solvent so that paste is obtained, and iii) the catalyst is applied to the electrolyte membrane 132 using a screen printing method. Other various methods of forming the catalyst layer may be employed. For example, a sheet may be produced using the paste containing the carbon powders supporting the aforementioned catalyst, and the sheet may be pressed onto the electrolyte membrane 132. Also, as the catalyst, alloy composed of platinum and other metal may be used.

The gas diffusion layer of each of the hydrogen electrode 134 and the oxygen electrode 136 is formed using carbon cloth woven from carbon fibers. The gas diffusion layer may be formed using carbon paper or carbon felt made of carbon fibers. Also, since the aforementioned catalyst needs to be provided between the gas diffusion layer and the electrolyte membrane 132, the catalyst may be applied to the side of the gas diffusion layer which contacts the electrolyte membrane 132, instead of applying the catalyst to the electrolyte membrane 132.

Each of the separators 110 and 120 is formed using a gas-impermeable and conductive member, such as densified carbon obtained by compressing carbon such that the carbon becomes gas-impermeable. Plural ribs are formed in parallel on both surfaces of each of the separators 110 and 120. The ribs on one surface do not necessarily need to be in parallel with the ribs on the other surface. The ribs may be formed at various angles. For example, the ribs on one surface may be orthogonal to the ribs on the other surface. Also, the ribs do not necessarily need to be grooves in parallel, as long as the fuel gas passage and the oxidizing gas passage can be formed.

In the fuel cell stack 10 according to the embodiment of the invention, the ribs of the separators 110 and 120 positioned at end portions in the cell-stacked direction of the unit cell 100 (in the vicinity of the end plates 12 and 14) have the following characteristics. That is, the ribs of the separators 110 and 120 at the end portions are formed such that the cross sectional area of each of the fuel gas passage 112 and the oxidizing gas passage 122 is larger than that of each of the fuel gas passage 112 and the oxidizing gas passage 122 formed by the separators 110 and 120 at other portions (not shown), for the following reasons. In the temperature distribution of the fuel cell stack 10, the temperature at a center portion in the cell-stacked direction of the fuel cell stack 10 is high, and the temperature at end portions is low. This is because the temperature of the unit cells 100 at the end portions are likely to be decreased due to heat radiation to the atmosphere. In the unit cells 100 at the end portions, vapor pressure decreases due to a decrease in the temperature, and therefore generated water is likely to be accumulated. Accordingly, the cross sectional area of each of the gas passages is made large so that pressure loss is reduced, and each gas flows in each of the gas passages easily. Thus, excessive generated water is removed.

Coolant holes 151 and 152 having a circular cross section are formed at two portions in a peripheral portion of each of the separators 110 and 120. The coolant holes 151 and 152 form a coolant passage extending in the cell-stacked direction of the fuel cell stack 10 when the unit cells 100 are stacked.

Each of fuel gas holes 153 and 154 and oxidizing gas holes 155 and 156 having a long narrow shape is formed in the vicinity of each side of the separators 110 and 120, along each side. The fuel gas holes 153 and 154 and the oxidizing gas holes 155 and 156 form the fuel gas passage 112 and the oxidizing gas passage 122 extending in the cell-stacked direction of the fuel cell stack 10, respectively when the fuel cell stack 10 is formed by stacking the unit cells 100. In the embodiment of the invention, a fuel gas supply passage is formed along an upper side, and a fuel gas discharge passage is formed along a lower side in FIG. 2. Also, an oxidizing gas supply passage is formed along a left side, and an oxidizing gas discharge passage is formed along a right side.

The fuel gas supply port 35 of the fuel cell stack 10 is connected to the fuel gas supply passage. The fuel gas discharge port 36 is connected to the fuel gas discharge passage. The fuel gas supplied from the fuel gas supply port 35 flows into the fuel gas passage 112 of the each unit cell 100 through the fuel gas supply passage. Then, after the fuel gas is used for a predetermined reaction, the fuel gas flows to the fuel gas discharge port 36 from the fuel gas discharge passage. The oxidizing gas flows in the similar route.

The oxidizing gas supply port 33 of the fuel cell stack 10 is connected to the oxidizing gas supply passage. Also, the oxidizing gas discharge port 34 is connected to the oxidizing passage. The oxidizing gas supplied from the oxidizing gas supply port 33 flows into the oxidizing gas passage 122 of each unit cell 100 through the oxidizing gas supply passage. Then, after the oxidizing gas is used for a predetermined reaction, the oxidizing gas flows to the oxidizing gas discharge port 34 from the oxidizing gas discharge passage.

In the fuel cell stack 10 according to the embodiment of the invention, cooling separators 140 are provided in the proportion of one cooling separator 140 to five unit cells 100. The cooling separator 140 is used for forming a coolant passage for cooling the unit cells 100. In the cooling separator 140, a serpentine coolant groove 142 which connects the coolant holes is formed. The surface of each of the separators 110 and 120 which is opposed to the cooling separator 140 is a flat surface without ribs. Thus, the groove provided in the cooling separator 140 forms the coolant passage between the cooling separator 140 and each of the separators 110 and 120. The separators 110 and 120, and the cooling separator 140 may be formed using various materials having conductivity in addition to densified carbon. For example, they may be formed using metal such as copper alloy or aluminum alloy, placing emphasis on rigidity and heat transferability. Also, the proportion of the cooling separators may be set to be in a range suitable for cooling according to the amount of heat of the unit cell 100 based on the output required of the fuel cell stack 10, the temperature and the flow amount of the coolant, and the like.

A first embodiment of the invention will be described.

First, configurations of the electrodes will be described.

Figure 3A:
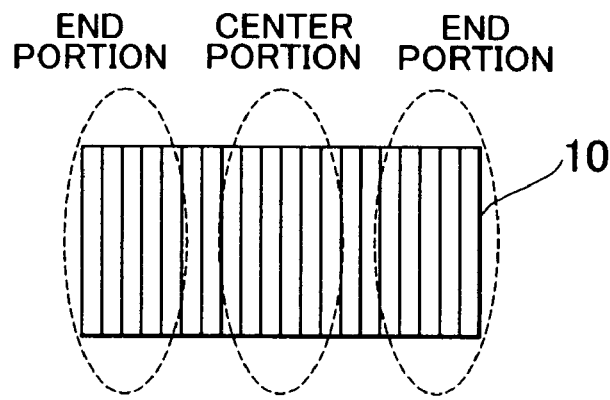
FIG. 3A to FIG. 3C are explanatory diagrams showing configurations of electrodes according to a first embodiment of the invention.
Figure 3B:
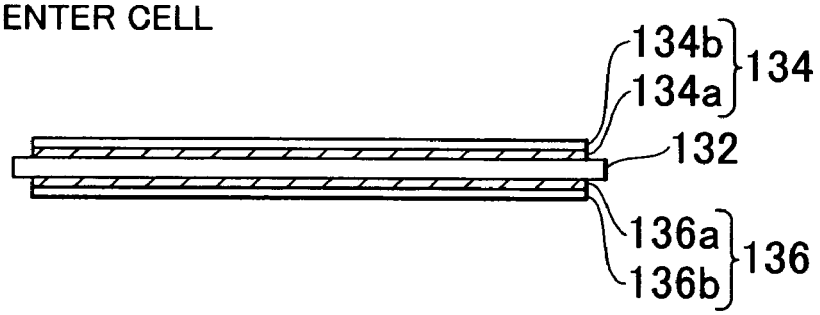
Figure 3C:
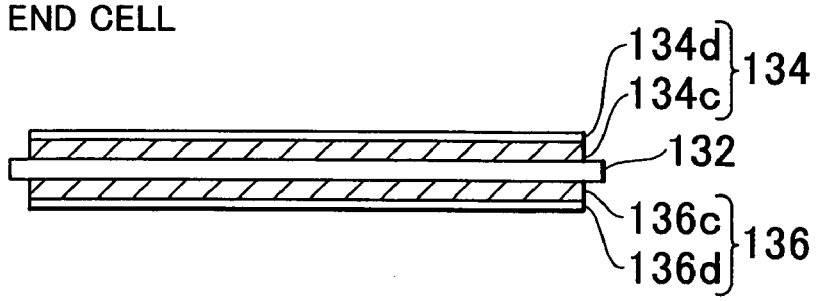

FIG. 3A is an explanatory diagram showing a configuration of the fuel cell stack 10 according to the first embodiment of the invention. FIG. 3B is a cross sectional view showing a configuration of an electrode of a unit cell positioned at the center portion of the fuel cell stack 10 (hereinafter, referred to as "center cell"). FIG. 3C is a cross sectional view showing a configuration of an electrode of a unit cell positioned at the end portion of the fuel cell stack 10 (hereinafter, referred to as "end portion cell").

As shown in FIG. 3B, in the center cell, a catalyst layer 134a and a gas diffusion layer 134b are stacked in this order on one surface of the electrolyte membrane 132, whereby the hydrogen electrode 134 is formed. Also, a catalyst layer 136a and a gas diffusion layer 136b are stacked in this order in the other surface of the electrolyte membrane 132, whereby the oxygen electrode 136 is formed.

Meanwhile, as shown in FIG. 3C, in the end portion cell, a catalyst layer 134c and a gas diffusion layer 134d are stacked in this order on one surface of the electrolyte membrane 132, whereby the hydrogen electrode 134 is formed. Also, a catalyst layer 136c and a gas diffusion layer 136d are stacked in this order in the other surface of the electrolyte membrane 132, whereby the oxygen electrode 136 is formed.

The water repellency of the gas diffusion layer in the center cell is different from that in the end portion cell. The water repellency of the gas diffusion layers 134d and 136d of the end portion cell is lower than that of the gas diffusion layers 134b and 136b of the center cell. Thus, generated water permeates the surface of the gas diffusion layers 134d and 136d easily, and is discharged together with gas easily. Accordingly, good gas permeability of the gas diffusion layers 134d and 136d can be maintained.

The type and specific surface area of the catalyst supported by the catalyst layer in the center cell are the same as those in the end portion cell. That is, the catalytic ability of the catalyst layer per unit volume in the center cell is the same as that in the end portion cell.

The thickness of each catalyst layer in the center cell is different from that in the end portion cell. The thickness of each of the catalyst layers 134c and 136c in the end portion cell is larger than the thickness of each of the catalyst layers 134a and 136a in the center cell. That is, the catalytic ability of each of the catalyst layers 134c and 136c in the end portion cell is higher than the catalytic ability of each of the catalyst layers 134a and 136a in the center cell. In the embodiment, the thickness of each of the catalytic layers 134c and 136c is two times as large as the thickness of each of the catalytic layers 134a and 136a in the center cell. In the embodiment, the thickness of the catalytic layer 134a and the thickness of the catalytic layer 136a in the center cell are the same. Also, the thickness of the catalytic layer 134c and the thickness of the catalytic layer 136c in the end portion cell are the same. However, the thickness of each of these catalytic layers may be set to any value.

Hereinafter, effects of the embodiment will be described.

Figure 4A:
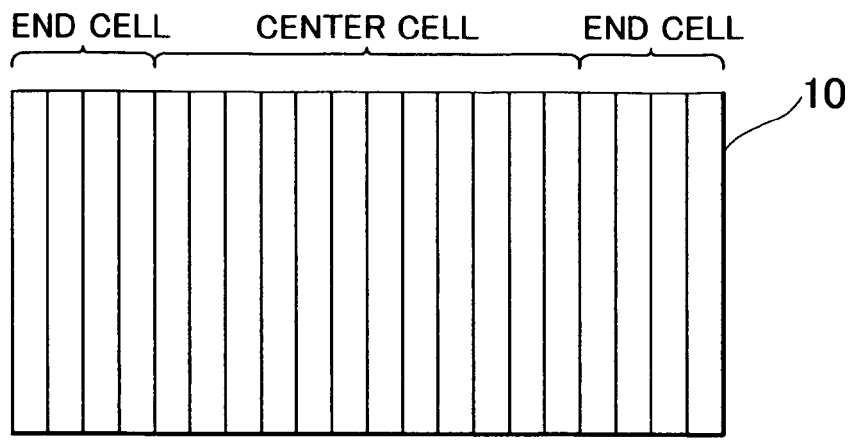
FIG. 4A to FIG. 4C are explanatory diagrams showing distributions in the fuel cell stack 10 in the cell-stacked direction.
Figure 4B:
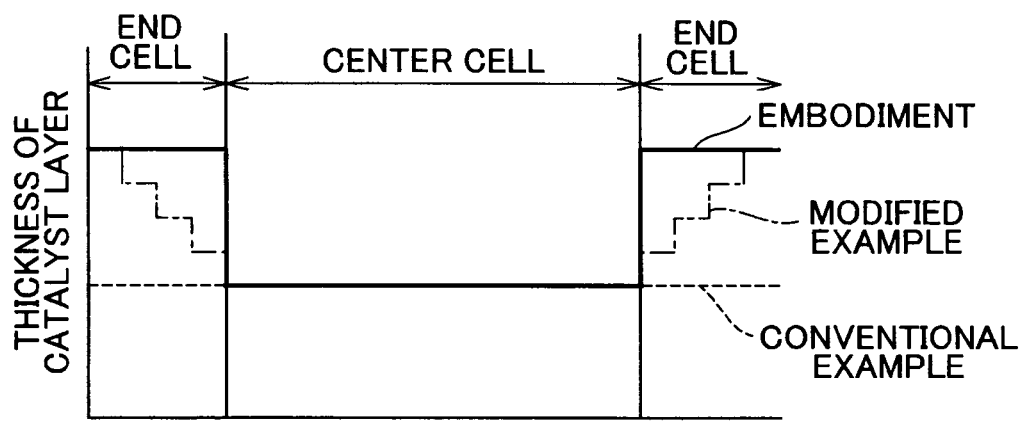
Figure 4C:
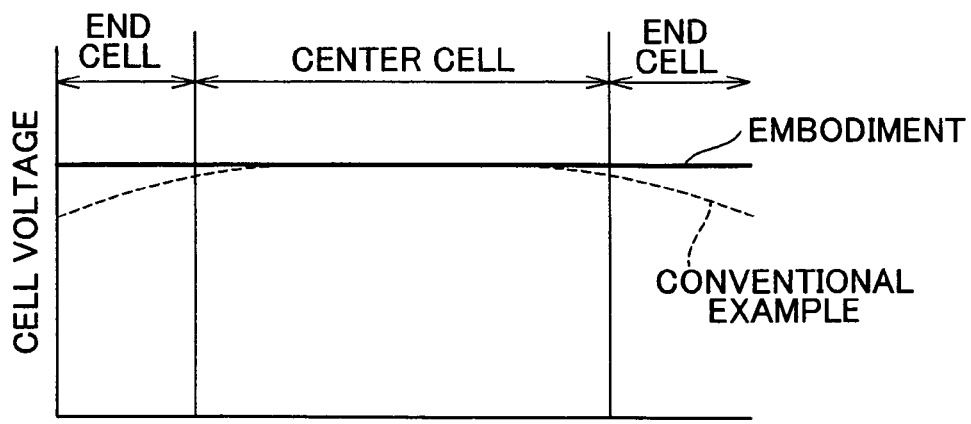

FIG. 4A to FIG. 4C are explanatory diagrams showing effects of the first embodiment. FIG. 4A schematically shows a side surface of the fuel cell stack 10 (seen in a direction orthogonal to the cell-stacked direction). In this case, four unit cells 100 positioned at each of both end portions in the cell-stacked direction are regarded as end portion cells. FIG. 4B shows a distribution of thickness of the catalyst layer in the cell-stacked direction. FIG. 4C shows a distribution of cell voltage in the cell-stacked direction. In each of FIG. 4B and FIG. 4C, each distribution according to the embodiment is shown by a solid line. Also, each distribution in a conventional fuel cell stack is shown by a dashed line. As shown in FIG. 4B, the conventional fuel cell stack is formed by stacking plural unit cells including the catalytic layers having the same thickness.

As shown in FIG. 4C, in the temperature distribution of the conventional fuel cell stack, the temperature is high at the center portion in the cell-stacked direction, and the temperature is low at the end portions in the cell-stacked direction. Therefore, the cell voltage decreases in the end portion cells. Meanwhile, in the fuel cell stack 10 according to the embodiment, substantially the same cell voltage is obtained in all the unit cells 100.

In the embodiment, as shown in FIG. 4B, the catalyst layers in the four end portion cells have the same thickness. However, as shown by a chain line as a modified example, the thickness of the catalyst layer may be changed stepwise, according to the temperature distribution.

In the fuel cell stack 10 according to the first embodiment that has been described so far, the thickness of each catalyst layer in the end portion cell is larger than that in the center cell. Therefore, the area in which the reaction occurs is increased in the end portion cell, and accordingly the catalytic ability of each catalyst layer can be increased. Thus, it is possible to suppress a decrease in the temperature of the end portion cells, and a decrease in the electric power generation performance of the fuel cell stack 10 due to flooding.

Hereinafter, a second embodiment of the invention will be described.

In the first embodiment, the thickness of each catalyst layer in the center cell is different from that in the end portion cell. In the second embodiment, the specific surface area of the catalyst supported by each catalyst layer in the center cell is different from that in the end portion cell.

Figure 5A:
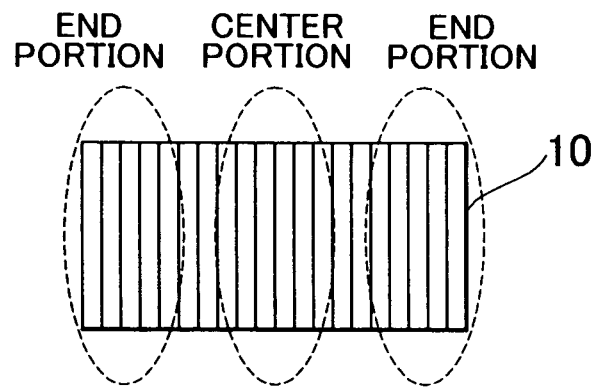
FIG. 5A to FIG. 5C are explanatory diagrams showing configurations of electrodes according to a second embodiment.
Figure 5B:
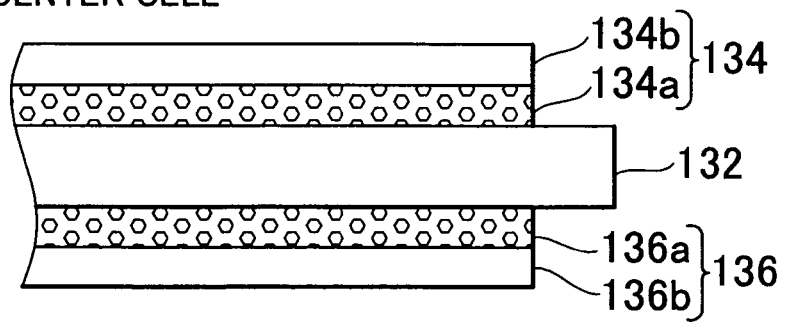
Figure 5C:
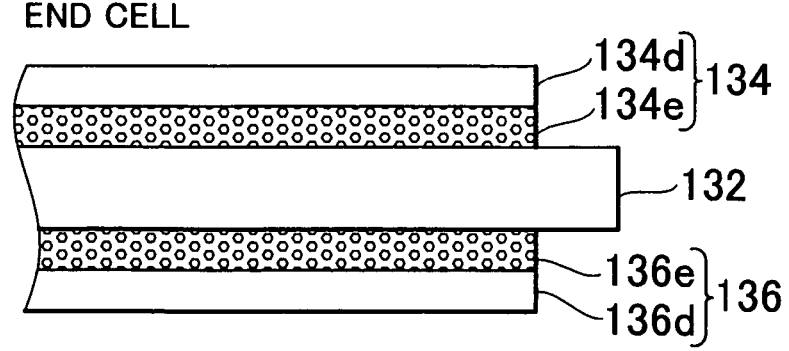

FIG. 5A to FIG. 5C are explanatory diagrams showing configurations of electrodes of the unit cells 100 according to a second embodiment of the invention. In the second embodiment, the thickness of each of the catalyst layers 134*a* and 136*a* in the center cell is the same as the thickness of each of the catalyst layers 134*e* and 136*e* in the end portion cell. The second embodiment is the same as the first embodiment, except that the specific surface area of the catalyst supported by each of the catalyst layers 134*e* and 136*e* in the end portion cell is larger than that of the catalyst supported by each of the catalyst layers 134*a* and 136*a* in the center cell.

In the fuel cell according to the second embodiment of the invention that has been described so far, the specific surface area of the catalyst supported by each catalyst layer in the end portion cell is larger than that of the catalyst supported by each catalyst layer in the center cell. Therefore, the area in which the reaction occurs can be increased in the end portion cell. Accordingly, it is possible to suppress a decrease in the temperature of the end portion cells, and a decrease in the electric power generation performance of the fuel cell stack 10 due to flooding.

The specific embodiments of the invention have been described so far. However, the invention is not limited to these embodiments. The invention can be realized in various embodiments without departing from the true spirit of the invention. For example, the invention can be realized in the following modified examples.

Hereinafter, a first modified example will be described.

In the aforementioned embodiments, the thickness of each catalyst layer in the end portion cell, or the specific surface area of the catalyst supported by each catalyst layer in the end portion cell is larger than that in the center cell according to the temperature distribution in the cell-stacked direction of the fuel cell stack 10. However, the invention is not limited to these embodiments. The type of the catalyst supported by each catalyst layer in the center cell may be different from that in the end portion cell. That is, the catalyst having catalytic ability higher than that of the catalyst in the center cell may be used in the end portion cell in which the temperature is likely to decrease.

Hereinafter, a second modified example will be described.

In the aforementioned embodiments, the thickness of each catalyst layer in the end portion cell, or the specific surface area of the catalyst supported by each catalyst layer in the end portion cell is larger than that in the center cell according to the temperature distribution in the cell-stacked direction of the fuel cell stack 10. However, the invention is not limited to these embodiments. In the second modified example, the thickness of the catalyst layer is changed in each unit cell 100 according to an in-plane temperature distribution.

Figure 6A:
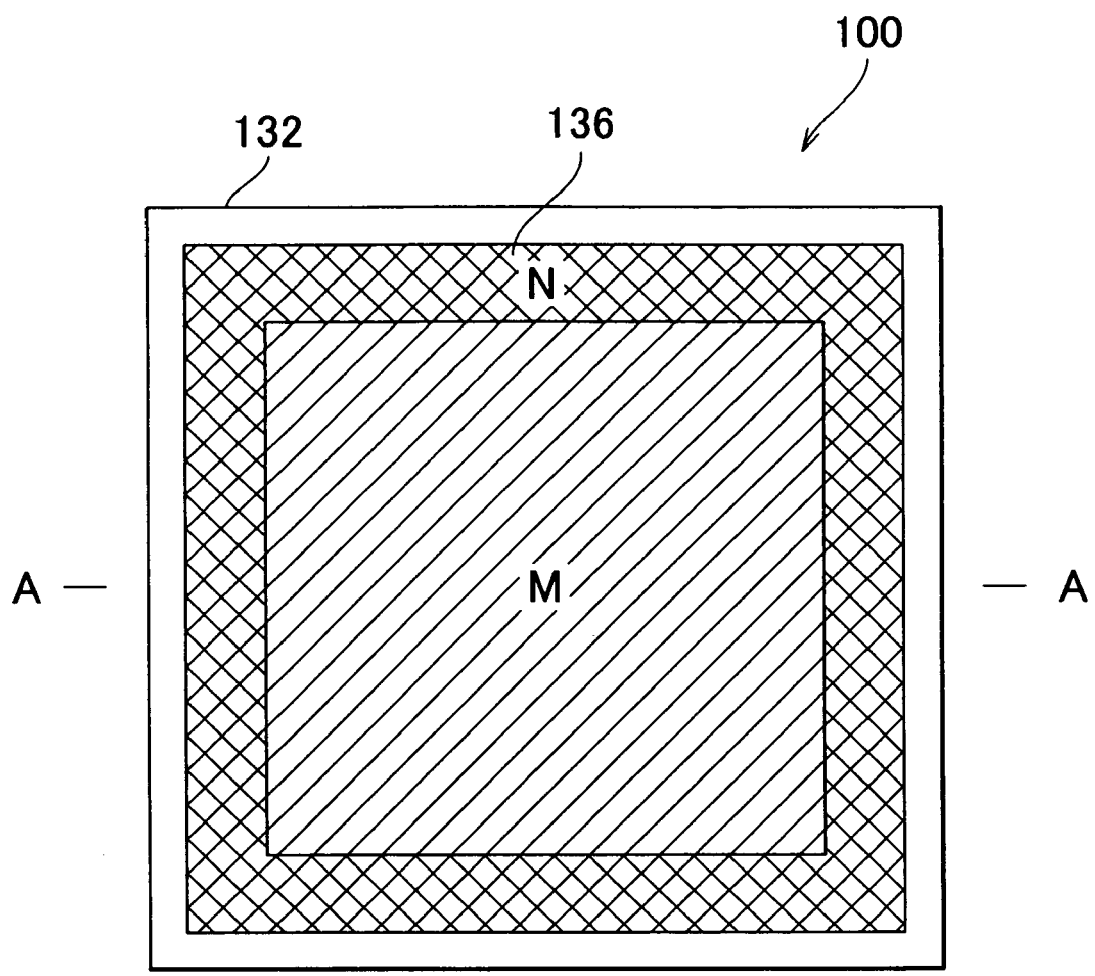
FIG. 6A and FIG. 6B are explanatory diagrams showing an example of a configuration of an electrode of a unit cell 100 according to a modified example 1.
Figure 6B:
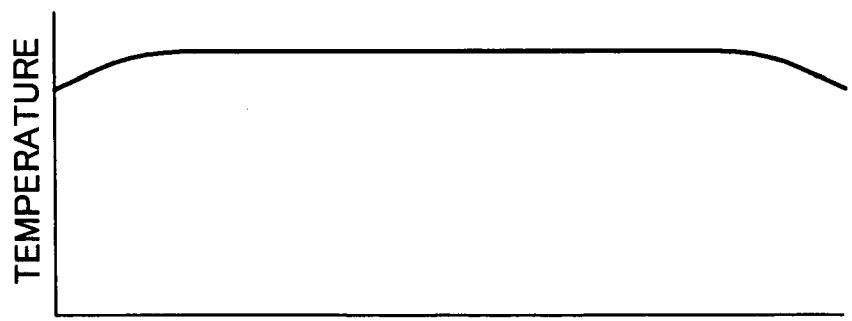

FIG. 6A and FIG. 6B are explanatory diagrams showing an example of a configuration of an electrode of the unit cell 100 in the second modified example. FIG. 6A shows the unit cell 100 seen from the oxygen electrode 136 side. In FIG. 6A, for the sake of convenience, the separator 110 and the gas diffusion layer 136*b* are omitted. FIG. 6B shows the temperature distribution in the cross section taken along line A-A of FIG. 6A (in-plane temperature distribution).

In FIG. 6A, a hatched region M at the center portion corresponds to a region in which the temperature is relatively high. A cross-hatched region N in the peripheral region corresponds to a region in which the temperature is relatively low. The thickness of the catalyst layer is non-uniform in the plane. The thickness of the catalyst layer in the region N is larger than that of the catalyst layer in the region M. The hydrogen electrode 134 side is the same as the oxygen electrode 136 side.

In the aforementioned configuration as well, it is possible to suppress a decrease in the temperature, and a decrease in the electric power generation performance of the fuel cell stack 10 due to flooding.

In the second modified example, the thickness of the catalyst in the region N is different from that in the region M. However, the specific surface area of the catalyst supported by the catalyst layer or the type of the catalyst in the region N may be different from that in the region M. Also, in the second modified example two types of regions are provided according to the temperature distribution. However, three or more types of regions may be provided.

A third modified example will be described.

In the aforementioned embodiments, although the invention is applied to both of the hydrogen electrode 134 and the oxygen electrode 136, the invention may be applied to one of the hydrogen electrode 134 and the oxygen electrode 136. However, it is preferable that the invention should be applied to at least the oxygen electrode 136. This is because the reaction rate of the cathode reaction at the oxygen electrode is lower than that of the anode reaction at the hydrogen electrode.

Hereinafter, a fourth modified example will be described.

In the first embodiment, the invention is applied to the unit cells 100 at both end portions of the fuel cell stack 10. However, the invention may be applied to one of the both end portions of the fuel cell stack 10.

Also, plural unit cells 100 may include a unit cell 100 including a catalyst layer having a catalytic ability that is different from that of catalyst layers of other unit cells. For example, in the fuel cell stack 10 according to the aforementioned embodiments, since the cooling separator 140 is provided, the temperature of the unit cell adjacent to the cooling separator 140 is likely to decrease. Therefore, in the unit cell 100 adjacent to the cooling separator 140, the thickness of the catalyst layer may be increased, the specific surface area of the catalyst supported by the catalyst layer may be increased, or the catalyst may have a high catalytic ability.

Also, in the unit cell which is likely to be dried due to high temperature, the catalytic layer having a high catalytic ability may be used. With the configuration, it is possible to suppress a decrease in the electric power generation performance of the fuel cell stack 10 due to drying of the electrolyte membrane.

Hereinafter, a fifth modified example will be described.

In each of the aforementioned embodiments and the first modified example, the parameter concerning the catalytic ability, that is, the thickness of the catalyst layer, the specific surface area of the catalyst supported by the catalyst layer, or the type of the catalyst is changed independently. However, at least two of the parameters may be changed in combination.

Hereinafter, a sixth modified example will be described.

In the aforementioned embodiments, the invention is applied to the polymer electrolyte fuel cell. However, the invention may be applied to other types of fuel cells having a stack structure.

Hereinafter, a seventh modified example will be described.

In the aforementioned embodiments and the modified examples, the catalyst layer having a high catalytic ability is used in the unit cell whose temperature is likely to decrease, or the unit cell in which flooding is likely to occur. However, the invention is not limited to these embodiments and the modified examples. Since the invention is made to suppress a decrease in the electric power veneration performance of the fuel cell even in the case where the temperature or the wet state of the unit cell is not optimal in the fuel cell stack, the catalyst layer having a high catalytic ability may be used in the unit cell which is likely to be dried.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A fuel cell stack comprising:
a plurality of unit cells each of which includes an anode and a cathode which are provided on both sides of a predetermined electrolyte membrane, and a catalytic layer which is provided in at least one of the anode and the cathode, and which supports a catalyst for promoting an anode reaction or a cathode reaction, the plurality of unit cells being stacked in a stacking direction, wherein the plurality of unit cells include at least one unit cell including a catalyst layer in which an in-plane distribution, that is perpendicular to the stacking direction, of at least one of type, weight per unit area, and specific surface area of the catalyst is non-uniform, a center portion formed with reference to a center of the catalyst layer in a plane that is perpendicular to the stacking direction and a peripheral portion formed around the center portion, a catalytic ability of the peripheral portion being higher than that of the center portion.

2. The fuel cell stack according to claim 1, wherein the in-plane distribution in the at least one unit cell depends on an in-plane temperature distribution or an in-plane distribution of a wet state in the unit cell.

3. The fuel cell stack according to claim 1, wherein the in-plane distribution of at least one of the weight per unit area and the specific surface area of the catalyst is non-uniform in the catalyst layer of the at least one unit cell such that at least one of the weight per unit area and the specific surface area of the catalyst is larger at the peripheral portion than at the center portion.

4. The fuel cell stack according to claim 1, wherein the in-plane distribution of the type of the catalyst is non-uniform in the catalyst layer of the at least one unit cell such that a rate of the reaction is higher at the peripheral portion than at the center portion.

5. The fuel cell stack according to claim 1, wherein the electrolyte membrane is a solid polymer electrolyte membrane.

* * * * *